US007614433B2

(12) United States Patent
Arasmith

(10) Patent No.: US 7,614,433 B2
(45) Date of Patent: Nov. 10, 2009

(54) WOOD-REDUCING APPARATUS WITH CONTINUAL FEEDER ASSEMBLY

(75) Inventor: Stanley D. Arasmith, Rome, GA (US)

(73) Assignees: Arasmith Industries International, LLC, Armuchee, GA (US); Arasmith Manufacturing Company, Inc., Armuchee, GA (US)

( * ) Notice: Subject to any disclaimer, the term of this patent is extended or adjusted under 35 U.S.C. 154(b) by 327 days.

(21) Appl. No.: 11/566,568

(22) Filed: Dec. 4, 2006

(65) Prior Publication Data

US 2007/0215303 A1 Sep. 20, 2007

Related U.S. Application Data

(62) Division of application No. 10/650,118, filed on Aug. 26, 2003, now Pat. No. 7,143,796.

(60) Provisional application No. 60/406,022, filed on Aug. 26, 2002.

(51) Int. Cl.
*B23Q 15/00* (2006.01)

(52) U.S. Cl. ....................... 144/394; 144/163; 144/174; 144/180; 144/404; 241/194

(58) Field of Classification Search ............. 144/162.1, 144/163, 172–174, 382, 391, 392, 394, 402, 144/404, 180; 241/189.1, 190, 191, 193, 241/194, 225
See application file for complete search history.

(56) References Cited

U.S. PATENT DOCUMENTS 2,323,760 A * 7/1943 Wolfinger .................. 83/425.2
2,361,147 A * 10/1944 Nordstrom ................. 83/425.3
3,195,594 A * 7/1965 Bloomquist et al. ........... 83/872
3,585,791 A * 6/1971 Batog .......................... 56/364
3,688,997 A * 9/1972 Ullner ......................... 241/36
3,690,568 A * 9/1972 Alexander ................... 241/15
4,205,570 A * 6/1980 Soodalter ................... 83/404.2
4,206,672 A * 6/1980 Smith .......................... 83/415
4,207,653 A * 6/1980 Gasbarro .................... 452/169
4,305,590 A * 12/1981 Haikkala et al. ............ 277/646
4,444,234 A * 4/1984 Arasmith .................... 144/370
4,569,380 A * 2/1986 Arasmith .................... 144/172
4,595,150 A * 6/1986 Aario .......................... 241/282
4,697,626 A * 10/1987 Arasmith .................... 144/373
4,776,375 A * 10/1988 Arasmith .................... 144/241
4,785,860 A * 11/1988 Arasmith .................... 144/174
4,829,865 A * 5/1989 Nunnery et al. ............ 83/425.3
4,874,024 A * 10/1989 Arasmith .................... 144/174
5,070,918 A * 12/1991 Pallmann .................... 144/172
5,413,286 A * 5/1995 Bateman ..................... 241/190
5,505,393 A * 4/1996 Serban et al. ............. 241/86.1

(Continued)

*Primary Examiner*—Shelley Self
(74) *Attorney, Agent, or Firm*—Alston & Bird LLP

(57) ABSTRACT

Apparatuses, methods, and systems for producing wood chips are disclosed. The disclosure in one embodiment produces smooth wood chips of generally uniform size and shape, suited for use in making paper, cardboard, and other recyclable materials. In one embodiment, an apparatus is disclosed for collecting, aligning and guiding wood scraps through an array of spaced-apart saw blades using a feeder assembly operating on a continual basis. The feeder assembly in one embodiment includes one or more paddle assemblies shaped to align and guide the wood scraps along a feeder path toward the saw blades. A system for controlling an apparatus is also disclosed. A method for reducing wood scraps into cut chips is also disclosed.

5 Claims, 9 Drawing Sheets

U.S. PATENT DOCUMENTS 5,863,003 A * 1/1999 Smith .......................... 241/73
5,915,636 A * 6/1999 Caballero .................... 241/73
7,143,796 B2 * 12/2006 Arasmith .................... 144/373

* cited by examiner

WOOD-REDUCING APPARATUS WITH CONTINUAL FEEDER ASSEMBLY

CROSS REFERENCE TO RELATED APPLICATIONS

This application is a divisional of application Ser. No. 10/650,118 filed Aug. 26, 2003 now U.S. Pat. No. 7,143,796 and claims the benefit and priority of the U.S. Provisional Application bearing Ser. No. 60/406,022, filed Aug. 26, 2002, entitled "Improved Wood Reducing Apparatus Including Slotted Paddle Wheel Feed Drum," both of which are incorporated herein by reference in their entirety.

FIELD

The material described herein relates generally to the field of wood and lumber processing and, more particularly, to the efficient reduction or cutting of scrap wood into useable chips.

BACKGROUND

Lumber mills and other wood processing facilities typically generate wood scraps of various sizes. In plywood processing mills, for example, the wood scraps can be in the form of thin, elongate, veneer-like strips. To be useful in the manufacture of paper, cardboard, and other recyclable materials, wood scraps must be reduced into wood chips having an acceptable size and shape. Mills use screens to separate acceptable wood chips from oversized wood chips. The oversized wood chips are sometimes referred to as overs because they pass over the separating screens.

Ideally, the overs need to be reduced to wood chips that are relatively uniform in size, having gross dimensions of approximately one inch or less. The desirable chip size may vary, depending upon the intended use. Several different types of machines have been tried for reducing overs, such as disc chippers, drum chippers, chip hogs, and the like. These machines often crush or pulverize the overs into unusable bits that are unacceptable for use in making paper, for example.

Mills typically generate a nearly steady flow of overs during wood processing, creating a concomitant need for a system capable of processing overs continuously. The flow of incoming overs may vary greatly, from zero to a large batch, depending upon the mill operations. Most available systems are not capable of adapting to changing volumes without interrupting processing or requiring expensive manual labor when a system becomes jammed or overloaded.

The presence of metal objects in batch wood processing presents an ongoing challenge to facilities where equipment is both expensive and sensitive to damage from metal. The cost and delay of stopping a major piece of equipment to remove metal or repair the damage it caused represents an unacceptable expense for most facilities. Even small metal objects can cause significant damage, especially to grinders and chippers having an array of closely-spaced saw blades. The machinery in use, for example, to reduce overs into small wood chips may be particularly vulnerable to damage from small metal objects.

Thus, there is a need in the art for improvements for the task of safely reducing overs to an acceptable and useful size, efficiently and steadily, during ongoing mill operations.

SUMMARY

The following summary is not an extensive overview and is not intended to identify key or critical elements of the systems, methods, apparatuses, processes, and the like or to delineate the scope of such elements. This Summary provides a conceptual introduction in a simplified form as a prelude to the more-detailed description that follows.

Certain illustrative systems, methods, apparatuses, processes, and the like are described herein as examples in connection with the following description and the accompanying drawing figures. These examples represent but a few of the various ways in which the principles underlying the systems, methods, apparatuses, processes, and the like may be employed and thus are intended to include equivalents. Other advantages and novel features may become apparent from the detailed description presented later, when considered in conjunction with the drawing figures.

The above and other needs are met by the present invention which, in one embodiment, provides a system, method, and apparatus for reducing a continuous incoming flow of oversized wood chips known as overs by cutting them smoothly, with minor impact, so the resulting chips are suitable for making paper, cardboard, and other recyclable materials.

The examples described herein include an apparatus for reducing the size of wood chips. The apparatus may include a saw assembly having an array of blades disposed upon a shaft and configured to be driven at a cutting speed in a first rotational direction. The shaft may define a shaft interference zone. The apparatus may also include a feeder assembly configured to direct a flow of the wood chips along a feeder path, the feeder path passing into and through the array of blades. The feeder assembly may define a feeder zone at least partially intersecting the array of blades. The apparatus may also include a topper assembly positioned proximate the feeder path, the topper assembly located upstream of the saw assembly relative to the feeder path. The topper assembly may be configured to reduce the height of the flow of the wood chips such that the flow of wood chips does not tend to extend into the shaft interference zone. The apparatus may reduce the wood chips into a plurality of cut chips.

The saw assembly may be positioned such that the shaft interference zone nearly intersects tangentially with the feeder zone.

The topper assembly may be positioned such that the topper zone nearly intersects tangentially with the feeder zone.

The saw assembly may further include an array of spacers disposed upon the shaft, with the spacers positioned alternately between the array of blades.

The feeder assembly may include one or more paddle assemblies configured to be driven along the feeder path at a feeder speed in a direction generally opposing the first rotational direction. Each of the paddle assemblies may define an array of slots therethrough, positioned to accept insertion of the array of blades.

The paddle assemblies may include a series of like paddle members. The paddle assemblies may be disposed upon a drum and the drum may be mounted upon a feeder shaft.

In one embodiment, the paddle assemblies may be mounted to an endless chain configured to be driven along an endless feeder path about one or more powered rollers, the endless feeder path comprising one or more either straight or curved segments, and the endless path may coincide with the feeder path at least during the flow through the array of blades.

The paddle assemblies may also include a scoop portion shaped to cradle the wood chips and a fence portion shaped to contain the wood chips during the flow through the array of blades.

The paddle assemblies may be shaped to align the oblong chips generally transverse to the array of blades in preparation for the flow through the saw assembly.

The fence may be further shaped to contain the wood chips in opposition generally to the wind force created by the saw assembly.

The topper assembly may include one or more topper blades disposed upon a shaft and configured to be driven at a topping speed in the first rotational direction.

The apparatus may further include a conveyor assembly providing an incoming flow of the wood chips.

The apparatus may also include a chute disposed in an engaged position to guide the flow of the wood chips toward the feeder assembly, the chute having a floor and a lower chute edge.

The chute may further include a chute actuator configured to move the chute relative to the feeder assembly between the engaged position and a disengaged position, the disengaged position characterized by the chute guiding the wood chips away from the feeder assembly; and a chute controller operably connected to the chute actuator.

The chute may further include a chute load sensor positioned along the chute near the flow of wood chips; the chute load sensor operably connected to the chute controller, the chute load sensor capable of transmitting at least a normal signal and a fault signal.

The chute load sensor may include a metal detector, and the fault signal indicates a metal object in the flow of wood chips.

In one embodiment, the chute actuator moves the chute into the disengaged position in response to a fault signal.

The apparatus may also include a dam positioned between the chute and the feeder assembly, the dam shaped to urge the wood chips toward the feeder assembly. The dam may include an inner face oriented toward the feeder assembly (the inner face shaped to nearly coincide with the feeder zone), a trailing dam edge, and a leading dam edge.

The dam may be stationary relative to the feeder assembly and the trailing dam edge may nearly meet the lower chute edge when the chute is in the engaged position. Where the paddle assemblies include an outer paddle face and a leading paddle edge, the dam may be positioned such that the outer paddle face nearly meets the inner dam face and the leading paddle edge nearly meets the leading dam edge.

In another example, an apparatus for reducing the size of wood chips may include a saw assembly having an array of blades disposed in spaced-apart relation upon a shaft and configured to be driven at a cutting speed in a first rotational direction, the shaft defining a shaft interference zone; a feeder assembly configured to direct a flow of the wood chips along a feeder path, the feeder path passing into and through the array of blades, the feeder assembly defining a feeder zone at least partially intersecting the array of blades, wherein the saw assembly is positioned such that the shaft interference zone nearly intersects tangentially with the feeder zone; a topper assembly positioned proximate the feeder path, the topper assembly located upstream of the saw assembly relative to the feeder path, the topper assembly configured to reduce the height of the flow of the wood chips such that the flow of wood chips does not tend to extend into the shaft interference zone, the topper assembly defining a topper zone, the topper assembly positioned such that the topper zone nearly intersects tangentially with the feeder zone; and a chute disposed in an engaged position to guide the flow of the wood chips toward the feeder assembly, the chute comprising a floor and a lower chute edge, the apparatus reducing the wood chips into a plurality of cut chips.

In another example, an apparatus for reducing the size of wood chips may include the elements described in the immediately-preceding paragraph and, in addition, a dam positioned between the chute and the feeder assembly, the dam shaped to urge the wood chips toward the feeder assembly, the dam comprising an inner face oriented toward the feeder assembly, the inner face shaped to nearly coincide with the feeder zone, a trailing dam edge, and a leading dam edge.

In another example, an apparatus for reducing the size of wood chips may include a saw assembly having an array of blades disposed in spaced-apart relation upon a shaft and configured to be driven at a cutting speed in a first rotational direction, the shaft defining a shaft interference zone; a feeder assembly configured to direct a flow of the wood chips along an endless feeder path, the endless feeder path comprising one or more either straight or curved segments, the feeder path passing into and through the array of blades, the feeder assembly defining a feeder zone at least partially intersecting the array of blades; a topper assembly positioned proximate the feeder path, the topper assembly located upstream of the saw assembly relative to the feeder path, the topper assembly configured to reduce the height of the flow of the wood chips such that the flow of wood chips does not tend to extend into the shaft interference zone, the topper assembly defining a topper zone, the apparatus reducing the wood chips into a plurality of cut chips.

In another aspect of the present invention, a control system for wood-reducing apparatus is disclosed. The system may include a saw load sensor operably connected to the saw assembly and configured to sense a saw load; a feeder load sensor operably connected to the feeder assembly and configured to sense a feeder load; a topper load sensor operably connected to the topper assembly and configured to sense a topper load; a chute load sensor operably connected to the chute and configured to sense a chute load; and a master controller operably connected to each of the respective sensors, each of the respective sensors capable of transmitting at least a normal signal and a fault signal.

In the exemplary control system, the master controller, in response to a fault signal from any of the respective sensors received at a start time, may (a) direct the chute actuator to move the chute into the disengaged position, the disengaged position characterized by the chute guiding the wood chips away from the feeder assembly; and (b) direct the feeder assembly to drive the feeder assembly in the first rotational direction. The master controller, in response to a normal signal from each of the respective sensors received at an end time following the start time, may also (a) direct the chute actuator to move the chute into the engaged position; and (b) direct the feeder assembly to drive the feeder assembly in a direction generally opposing the first rotational direction.

Also, in the exemplary control system, the master controller, in response to a fault signal from any of the respective sensors received at a first time, may (i) direct the feeder assembly to pause the feeder assembly; (ii) direct the saw assembly to pause the saw assembly; and (iii) direct the topper assembly to pause the topper assembly. The master controller, in response to a normal signal from each of the respective sensors received at a second time following the first time, may also direct the feeder assembly, saw assembly, and topper assembly, respectively, to return to the normal operating condition.

In another aspect of the present invention, a method of reducing the size of wood chips is disclosed. The method may include directing a flow of the wood chips along a feeder path, the feeder path passing into and through a saw assembly, the saw assembly having an array of blades disposed upon a shaft and configured to be driven at a cutting speed in a first rotational direction, the shaft defining a shaft interference zone; providing a feeder assembly configured to direct the flow of the wood chips along the feeder path, the feeder assembly defining a feeder zone at least partially intersection the array of blades; and positioning a topper assembly proximate the feeder path, the topper assembly located upstream of the saw assembly relative to the feeder path, the topper assembly configured to reduce the height of the flow of the wood chips such that the flow of wood chips does not tend to extend into the shaft interference zone, the topper assembly defining a topper zone.

The method may also include positioning the saw assembly such that the shaft interference zone nearly intersects tangentially with the feeder zone; and positioning the topper assembly such that the topper zone nearly intersects tangentially with the feeder zone.

The method may also include equipping the feeder assembly with one or more paddle assemblies configured to be driven along the feeder path at a feeder speed in a direction generally opposing the first rotational direction, each of the one or more paddle assemblies defining an array of slots therethrough; and positioning the slots to accept insertion of the array of blades.

The method may also include mounting the one or more paddle assemblies to an endless chain configured to be driven along an endless feeder path about one or more powered rollers, the endless feeder path comprising one or more either straight or curved segments, and the endless path coinciding with the feeder path at least during the flow through the array of blades.

The method may also include shaping the one or more paddle assemblies to align the wood chips generally transverse to the array of blades in preparation for the flow through the saw assembly; providing a scoop portion shaped to cradle the wood chips substantially within each of the one or more paddle assemblies; and providing a fence portion shaped to contain the wood chips substantially within each of the one or more paddle assemblies during the flow through the array of blades.

The method may also include equipping the topper assembly with one or more topper blades disposed upon a shaft and configured to be driven at a topping speed in the first rotational direction.

The method may also include providing a chute disposed in an engaged position to guide the flow of the wood chips toward the feeder assembly, the chute comprising a floor and a lower chute edge.

The method may also include providing a chute actuator configured to move the chute relative to the feeder assembly between the engaged position and a disengaged position, the disengaged position characterized by the chute guiding the wood chips away from the feeder assembly; operably connecting a chute controller to the chute actuator; locating a chute load sensor along the chute near the flow of wood chips, the chute load sensor capable of transmitting at least a normal signal and a fault signal; and operably connecting the chute load sensor to the chute controller.

The method may also include the chute actuator moving the chute into the disengaged position in response to a fault signal.

The method may also include positioning a dam between the chute and the feeder assembly, the dam shaped to urge the wood chips toward the feeder assembly; and shaping the dam to include an inner face oriented toward the feeder assembly, the inner face shaped to nearly coincide with the feeder zone, a trailing dam edge, and a leading dam edge.

The method may also include mounting the dam in a stationary location relative to the feeder assembly; positioning the dam such that the trailing dam edge nearly meets the lower chute edge when the chute is in the engaged position.

The method may also include, where the one or more paddle assemblies comprises an outer paddle face and a leading paddle edge, positioning the dam such that the outer paddle face nearly meets the inner dam face; and positioning the dam such that the leading paddle edge nearly meets the leading dam edge.

These and other objects, features, and advantages of the present invention will become apparent upon reading the following detailed description of a preferred embodiment of the invention when taken in conjunction with the drawing and the appended claims.

BRIEF DESCRIPTION OF THE DRAWING

The invention will be more readily understood by reference to the following description, taken with the accompanying drawing figures, in which.

DETAILED DESCRIPTION

Figure 1:
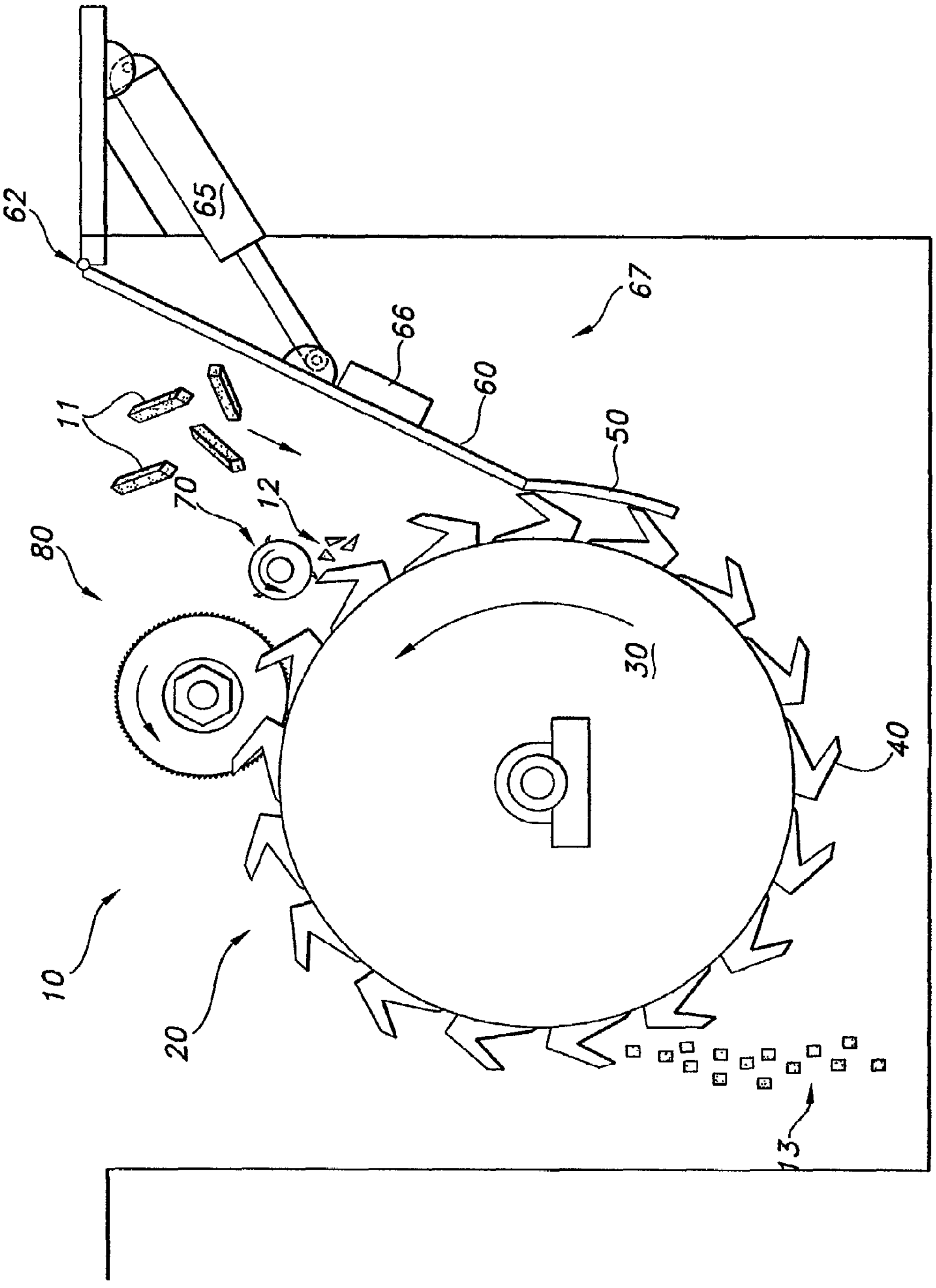
FIG. 1 is an illustration of a side elevation of an apparatus, according to one embodiment of the present invention.

The subject matter of this application is related to that of the following applications, each of which is incorporated herein by reference in its entirety: the U.S. Provisional Application bearing Ser. No. 60/189,317, filed Mar. 14, 2000; the U.S. Provisional Application bearing Ser. No. 60/202,721, filed May 8, 2000; and the U.S. Non-Provisional application bearing Ser. No. 09/805,754, filed Mar. 13, 2001, now U.S. Pat. No. 6,575,066 B2.

1. Introduction

Exemplary systems, methods, and apparatuses are now described with reference to the drawings, where like reference numerals are used to refer to like elements throughout the several views. In the following description, for purposes of explanation, numerous specific details are set forth in order to facilitate a thorough understanding of the systems, methods, apparatuses, processes, and the like. It may be evident, however, that the systems, methods, apparatuses, processes, and the like can be practiced without these specific details. In other instances, well-known structures and devices are shown in block diagram form in order to simplify the description.

"Controller," as used herein, includes but is not limited to hardware, firmware, software and/or combinations of each to perform one or more functions or actions. For example, based upon a desired application or needs, a controller may include a software-controlled microprocessor, a Programmable Logic Controller (PLC), a discrete logic system such as an Application-Specific Integrated Circuit (ASIC), or other programmed logic device. The logic driving a controller may be fully embodied as software.

“Signal,” as used herein, includes but is not limited to one or more electrical or optical signals, analog or digital, one or more computer instructions, a bit or bit stream, or the like.

“Sensor,” as used herein, includes but is not limited to one or more elements capable of sensing or otherwise receiving current data or status information from a particular location. A sensor may be used, for example, to indicate equipment status such as feed rate, tool wear, loss of prime on pumps, motor load or amperage, mixer viscosity, the presence of metal objects, or any type of overload or under-load condition. A sensor may also include equipment for staging or timing the operation pump motors, conveyors, hoppers, and other machinery. A sensor may include a current transformer, transducer, relays, alarm circuits, contactors, and auxiliary contacts.

“Software,” as used herein, includes but is not limited to, one or more computer readable and/or executable instructions that cause a computer, computer component, a controller such as a Programmable Logic Controller (PLC), and/or any other electronic device to perform functions, execute actions, receive and/or send signals, and/or behave in a desired manner. The instructions may be embodied in various forms like routines, algorithms, modules, methods, threads, ladder logic configurations, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

An “operable connection” (or a connection by which entities are “operably connected”) is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

“Data store,” as used herein, refers to a physical and/or logical entity that can store data. A data store may be, for example, a database, a table, a file, a list, a queue, a heap, a sequential function table, structured text, a ladder logic list, and so on. A data store may reside in one logical and/or physical entity and/or may be distributed between two or more logical and/or physical entities.

Furthermore, to the extent that the term “includes” is employed in the detailed description or the claims, it is intended to be inclusive in a manner similar to the term “comprising” as that term is interpreted when employed as a transitional word in a claim. Further still, to the extent that the term “or” is employed in the claims (for example, A or B) it is intended to mean “A or B or both.” When the author intends to indicate “only A or B but not both,” the author will employ the phrase “A or B but not both.” Thus, use of the term “or” herein is inclusive, not exclusive. See Garner, A Dictionary Of Modem Legal Usage 624 (2d ed. 1995).

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, ladder logic, structured text, and object-oriented and/or artificial intelligence techniques.

The processing, analyses, and/or other functions described herein may also be implemented by functionally equivalent circuits like a digital signal processor circuit, a software-controlled microprocessor, a Programmable Logic Controller (PLC), or an application-specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

2. A Wood-Reducing Apparatus

FIG. 1 illustrates an apparatus 10 having a saw assembly 80, a feeder assembly 20, and a topper assembly 70. Generally described, the apparatus 10 according to the present invention may be configured to reduce wood chips known as overs 11 by cutting them into smaller chips for use in making paper, cardboard, and other recyclable materials. The overs 11 may take different shapes, including thin strips, generally-prismatic oblong segments, or any irregular shapes.

The apparatus 10 of the present invention may include a reciprocating or endless feeder path, meaning the apparatus 10 may process a continual flow of incoming overs 11. The term continual is used herein because it implies a recurring event, as opposed to the term continuous, which implies an uninterrupted occurrence. The overs 11 may be supplied from the lumber mill or other wood processing facility in a generally continual flow, including periods where no overs 11 are incoming. The flow of incoming overs 11 may vary greatly in volume and duration, depending upon mill operations. The overs 11 in FIG. 1 are shown entering from above, generally, although the apparatus 10 may be configured to accept an incoming flow of overs 11 from any direction.

Figure 9:
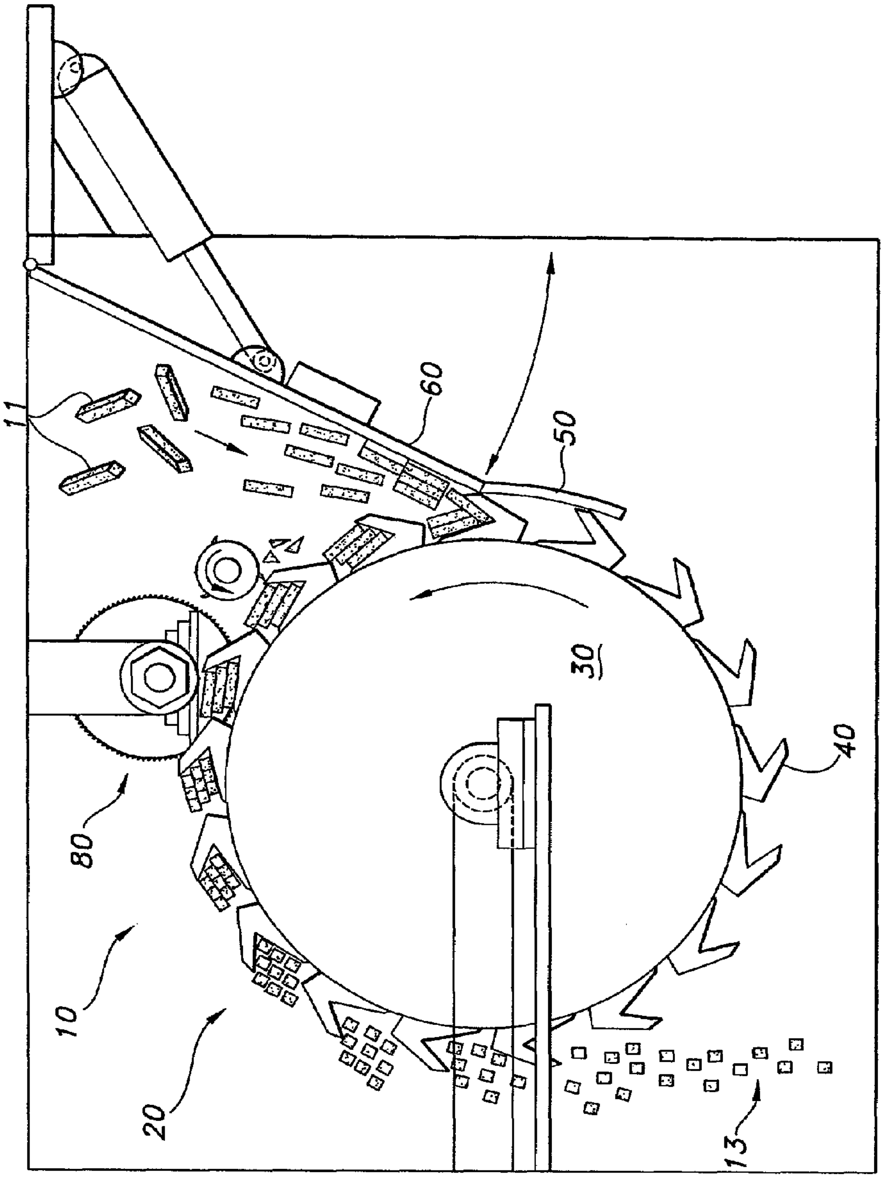
FIG. 9 is an illustration of a side elevation of an apparatus, according to one embodiment of the present invention.

The apparatus 10 of the present invention provides the components and a control system capable of processing an incoming flow of overs 11 on a continual basis or on a batch basis. The apparatus 10 directs a flow of overs 11 through a saw assembly 80, where the overs 11 are reduced into cut chips 13. As used herein, the phrase “directs a flow” of overs 11 is meant to include receiving an incoming flow, re-directing an existing flow, or creating a new flow from a static collection of chips. FIG. 9 illustrates a flow of wood chips 11 through an apparatus 10.

Beginning with entry of overs 11 into the area of the apparatus 10, and referring to FIG. 1, in one embodiment, the apparatus 10 may include a chute 60 to guide the overs 11 toward the feeder assembly 20. The chute 60 may be moveable, to allow the apparatus 10 to direct the overs 11 away from the feeder assembly 20 if and when a fault condition develops. The apparatus 10 may also include a dam 50 to urge the overs 11 into the feeder assembly 20. The dam 50 may be moveable or stationary, or it may be an integral part of the chute 60.

Figure 7:
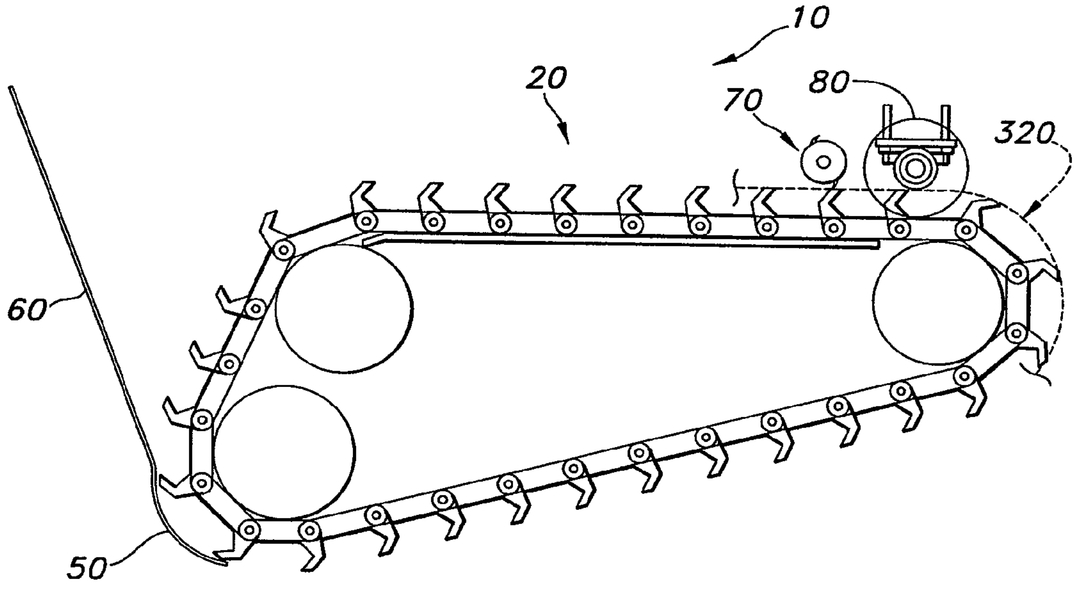
FIG. 7 is an illustration of a side elevation of an apparatus, according to one embodiment of the present invention.

The feeder assembly 20 directs the overs 11 along a feeder path toward and through the saw assembly 80. The feeder path may be generally circular, as shown in FIG. 1, or it may take different forms, as shown in FIG. 7. The feeder assembly 20 may be configured to rotate counter-clockwise with respect to the side view illustrated in FIG. 1. The feeder assembly 20 traces an imaginary feeder zone 320 (shown in FIG. 2) as it guides the overs 11 toward the saw assembly 80.

Figure 8:
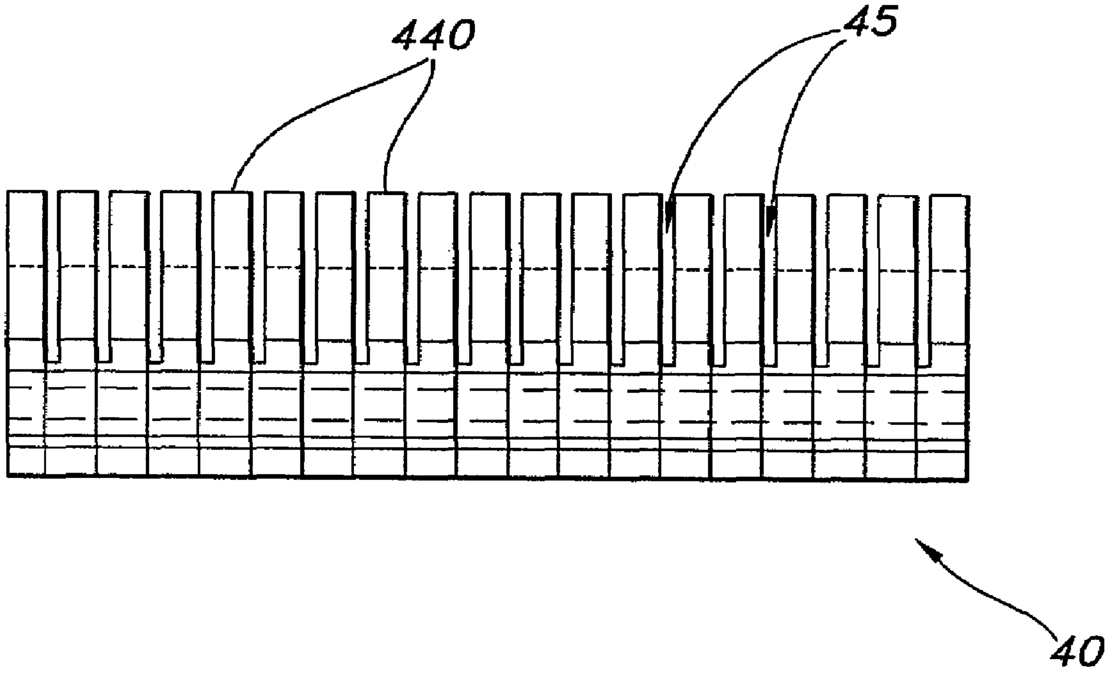
FIG. 8 is an illustration of an array of paddle members, according to one embodiment of the present invention.

In one embodiment, the feeder assembly 20 may include one or more paddle assemblies 40 disposed upon a rotating drum 30. A paddle assembly 40 may include a series of discrete paddle members 440, as shown in FIG. 8. In this embodiment, the outermost surface of the paddle assemblies 40 trace the feeder zone 320. Also, in this embodiment, each paddle assembly 40 may include an array of slots 45 such that the saw blades 83 extend into and pass through the slots 45 as the feeder assembly 20 moves past the saw assembly 80. In one embodiment, the paddle members 440 are spaced apart, thereby forming the slots 45, as shown in FIG. 8. In one embodiment, the paddle members 440 are constructed of steel and machined to precise tolerances to create uniform slots 45 of a desired width (to produce a desired chip size).

In an alternative embodiment, the paddle assemblies 40 may be constructed of a high-density plastic material. In one embodiment, a method of preparing the paddles for use may include installing blank (un-slotted) paddles and moving the feeder assembly 20 slowly toward and through the saw assembly 80 such that the saw blades 83 themselves cut the paddle slots 45. Allowing the saw blades 83 to cut their own corresponding slots 45 assures a good fit that is tailored to match the precise orientation of the saw blades 83, without requiring precise attachment of the paddle assemblies 40 to the drum 30.

Following the feeder path, as the feeder assembly 20 rotates, the overs 11 are directed first to the topper assembly 70. In this aspect, the topper assembly 70 is generally upstream from the saw assembly 80. The topper assembly 70 may be configured to rotate clockwise (opposing the rotation of the feeder assembly 20) with respect to the side view illustrated in FIG. 1. The topper assembly 70 traces an imaginary topper zone 370 (illustrated in FIG. 2) as it rotates. The topper assembly 70 may include one or more topper blades disposed upon a topper shaft and driven at a topping speed. The topper blades may be disposed in a spiral about a topper drum or in any other configuration suitable for cutting. In an embodiment with topper blades, the outermost surface of the topper blades would trace the topper zone 370.

Generally described, the topper assembly 70 removes excess overs 11 and/or cuts any portion of the overs 11 which may be extending beyond the feeder zone 320 (in other words, any overs 11 or any portion of the overs 11 extending to a height above the paddle assemblies 40 of the feeder assembly 20). In this aspect, the topper assembly 70 may strike and remove entire wood chips out of a paddle assembly 40 as it passes. Those portions of the overs 11 which are cut and removed by the topper assembly 70 may be referred to as tops 12. The excess overs 11 and tops 12 are removed at this point so they will not encroach upon or otherwise interfere with the shaft of the saw assembly 80. The tops 12, as shown, generally fall under the force due to gravity back toward the feeder assembly 20 to be captured and again directed toward the saw assembly 80.

After a particular paddle assembly 40 passes near the topper assembly 70 and the excess overs 11 and/or tops 12 are removed, the feeder assembly 20 continues to guide the overs 11 toward and into the saw assembly 80. In one embodiment, the saw assembly 80 may include a plurality of spaced-apart high-speed circular saw blades 83 mounted on a horizontal blade shaft 82 driven by a saw drive assembly. The saw assembly 80 may be configured to rotate clockwise (opposing the rotation of the feeder assembly 20) with respect to the side view illustrated in FIG. 1. The saw assembly 80 traces an imaginary sawing zone 380 (shown in FIG. 2) as the blades 83 rotate. Similarly, the saw blade shaft 82 traces an imaginary shaft interference zone 382 as it rotates. As mentioned above, the excess overs 11 and/or tops 12 are removed so they will not strike or otherwise interfere with the shaft 82; in other words, so no portion of the overs 11 will enter the shaft interference zone 382. In one embodiment, the saw blades 83 may be spaced apart by a plurality of saw blade spacers 84.

Figure 3:
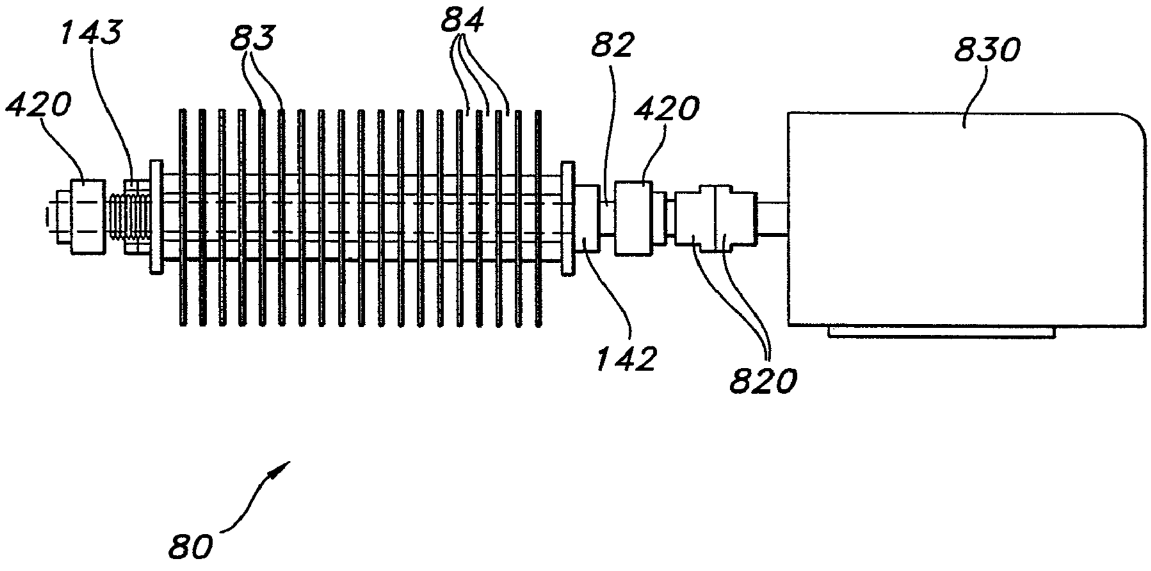
FIG. 3 is a cross-sectional illustration of a saw assembly, according to one embodiment of the present invention.

FIG. 3 is a cross-sectional illustration of a saw assembly 80 in one embodiment. The saw blades 83 may be horizontally stacked on a shaft 82 along with spacers 84 of appropriate thickness to produce a desired wood chip size. The saw blades 83 may be substantially planar and circular, and may include opposing saw blade keys cut into their center holes to provide an interlocking relationship with a pair of opposed blade shaft key slots on the blade shaft 82. The interlocking keys and key slots may be provided to prevent the saw blades 83 from rotating relative to the blade shaft 82.

In one aspect of the present invention, blades 83 and spacers 84 of various sizes may be provided and installed, to produce the desired chip size according to the intended use. The apparatus 10 may be configured with saws other than circular saws, including but not limited to band saws, jigsaws, chain saws, or other power saws. Saw blades 83 of any type may be used, without departing from the scope of the invention, to produce a desired chip size. Moreover, it should be understood that the saw blades 83 may be powered by devices other than the saw motor 830, depending upon the particular saw type selected for the application.

The blade shaft 82 may include a solid shoulder 142 proximate one end with threads on the opposite end. The threaded end of the shaft may allow a large shoulder nut 143 to be tightened against an adjacent spacer 84, causing the stacked spacers 84 and the saw blades 83 to be sandwiched together between the shoulder nut 143 and the shoulder 142, and holding the saw blades 83 in place on the blade shaft 82 to be rotated therewith. The shoulder nut 143 not only provides a stop for the endmost spacer 84, but also includes a pair of opposing flats which allow a wrench to grip the shaft 82 to control rotation thereof during assembly or disassembly. Journals near the ends of the blade shaft 82 for blade shaft bearings 420 with tapered bushings allow for easy removal of the bearings 420 (shown without frame supports for purposes of simplicity). A saw motor coupling 820 with a quick disconnect sleeve such as known in the art can be used.

FIG. 7 illustrates another embodiment of an apparatus 10 having a saw assembly 80, a feeder assembly 20, and a topper assembly 70, according to the present invention. The feeder assembly 20 may direct the overs through an irregular feeder path and, in turn, trace a feeder zone 320 such as the one shown in FIG. 7. The embodiment shown also includes a chute 60 and a dam 50. The feeder assembly 20 generally moves in a clockwise direction with respect to the view shown.

3. Zones of Interference

Figure 2:
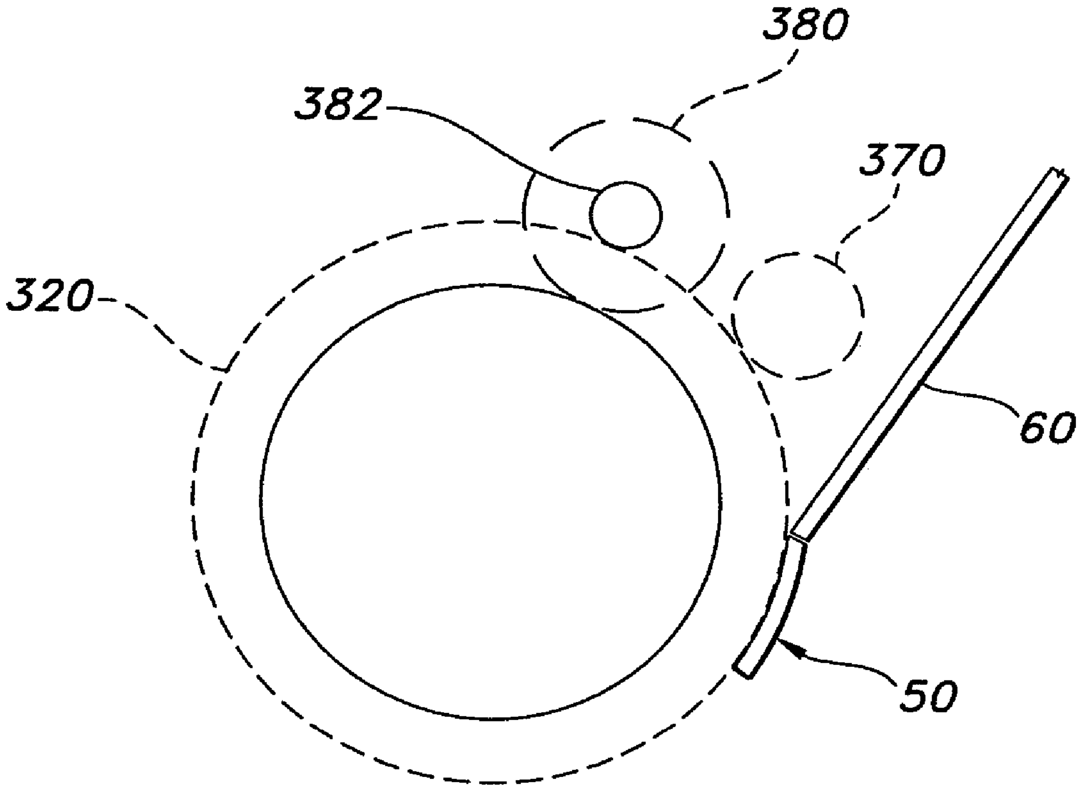
FIG. 2 is a schematic illustration of a side view of an apparatus, according to one embodiment of the present invention.

FIG. 2 is a side view illustration of several three-dimensional reference zones traced by elements of an apparatus 10 according to one embodiment of the present invention. The zones traced are three-dimensional. A generally cylindrical element, for example, will trace a three-dimensional zone shaped like a cylinder. A generally planar body rotating on a lengthwise hinge, for example, may trace a zone in the shape of a sector of a cylinder, somewhat resembling the shape of a pie slice.

Generally, as mentioned above, the feeder assembly 20 traces an imaginary feeder zone 320 as it moves. A feeder zone 320 is illustrated in FIG. 2. The saw assembly 80 traces a sawing zone 380. The saw blade shaft 82 traces a shaft interference zone 382. The topper assembly 70 traces a topper zone 370.

In one embodiment, the topper assembly 70 is positioned relative to the other elements such that the topper zone 370 nearly intersects tangentially the feeder zone 320. In so doing, the topper assembly 70 is positioned so it will not interfere with the moving parts of the feeder assembly 20. Also, the topper assembly 70 is positioned to remove any material that may tend to extend beyond the imaginary boundary created by the feeder zone 320. Keeping material within the feeder zone 320 is a goal for this embodiment because the saw blade shaft 82 may be damaged by excess material.

The saw assembly 80 in one embodiment is also positioned relative to the feeder zone 320. As shown, the shaft interference zone 382 also nearly intersects tangentially the feeder zone 320. Also, as shown, for an embodiment where the feeder assembly 20 includes one or more paddle assemblies 40, the sawing zone 380 may extend through nearly the full height of the paddle assemblies 40. By positioning the saw assembly 80 in this location, the apparatus 10 takes advantage of the full cutting width of the saw blades 83. Also, in this position, the saw assembly 80 will not interfere with the moving parts of the feeder assembly 20.

The dam 50 in one embodiment may be positioned so that it nearly coincides with the feeder zone 320. One of the roles of the dam 50 is to urge the overs 11 toward the feeder assembly so the overs 11 are nearly contained within the feeder zone 320 when they first enter the feeder assembly 20. In this aspect, the dam 50 may reduce the burden on the topper assembly 70. In an embodiment where the dam 50 may be part of the chute 60, the chute 60 may be positioned such that the lower, dam portion of the chute 60 nearly coincides with the feeder zone 320.

The chute 60 in one embodiment may be positioned so that its lower edge nearly intersects tangentially the feeder zone 320. By positioning the chute 60 as shown, the lower edge guides overs into the space between the dam 50 and the feeder assembly 20, such that the space lies generally within the feeder zone 320. In this aspect, the chute position also contributes to keeping the overs within the feeder zone 320.

The various positions are described as nearly tangential and nearly coinciding because a degree of separation or tolerance may exist between the elements of the apparatus 10 to allow relative movement and to prevent binding.

4. Guiding Overs into a Feeder Assembly

Figure 4:
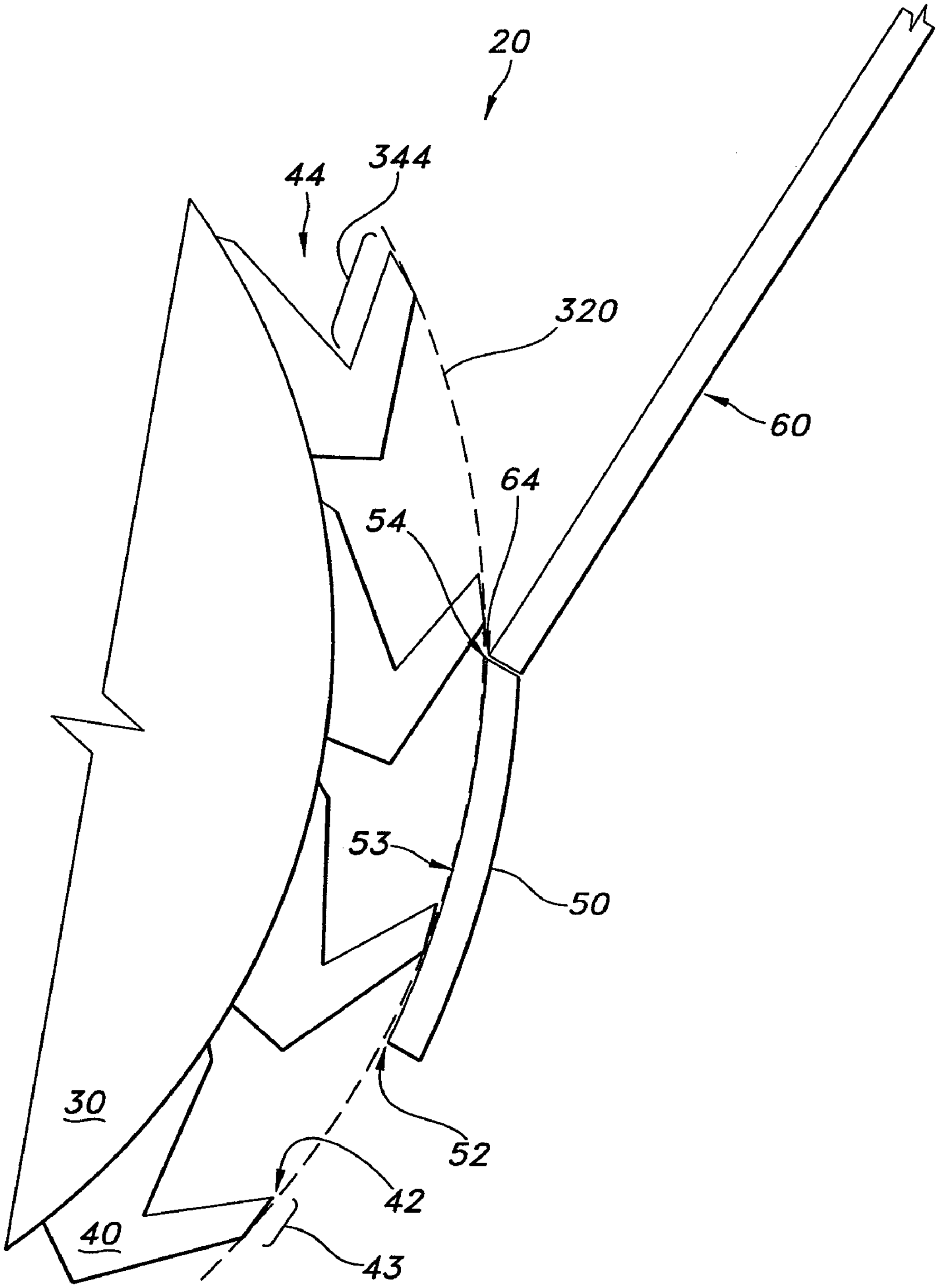
FIG. 4 is an illustration of a feeder assembly, according to one embodiment of the present invention.

FIG. 4 is a side view illustrating a portion of an apparatus 10, according to one embodiment. A portion of a feeder assembly 20 is shown; in particular, the embodiment that includes one or more paddle assemblies 40 disposed on a drum 30. In one embodiment, as shown the apparatus 10 may include a chute 60 and a dam 50, which may be an integral part of the chute 60 or a separate element.

Each paddle assembly 40, in one embodiment, includes a scoop portion 44 and a fence portion 344, as shown in FIG. 4. Recall the paddle assembly 40 may include a series of paddle members 440, as shown in FIG. 8, wherein each paddle member 440 has the same shape such that, together, the series of paddle members 440 forms a paddle assembly 40 like the one shown in FIG. 1. The scoop portion 44 generally holds a quantity of overs 11, conveying them along the feeder path. The scoop portion 44 is shaped to contain the overs 11; in three dimensions, the scoop portion 44 may be shaped like a trough. In one aspect, particularly for oblong overs, the scoop portion 44 may be shaped to align to the oblong overs in an orientation generally perpendicular to the blades 83 in the saw assembly 80. In this aspect, the scoop portion 44 is shaped to align the oblong overs in preparation for cutting in a direction generally transverse to the longer lengthwise dimension of each wood chip.

The fence portion 344 extends away from the drum 30, generally, on the open side of the scoop portion 44. Referring again to FIG. 1, the paddle assembly 40 that is passing through the saw assembly 80 shows one function of the fence portion 344 of each paddle assembly 40. The fence portion 344 holds the overs 11 in place during the cutting process. As shown in FIG. 1, the fence portion 344 is nearly radial with respect to the saw assembly. The nearly radial orientation of the fence portion 344 effectively holds the overs during cutting and helps resists the force imparted to the overs 11 by the rotating blades of the saw assembly 80. The force imparted may include not only the force exerted by the blades themselves, but also the wind or airflow creating by the saw assembly 80. The fence portion 344 also resists the wind force, which may be particularly helpful when processing small or lightweight overs 11.

Each paddle assembly 40 may also include an outer paddle face 43 and a leading paddle edge 42, as shown in FIG. 4, in one embodiment. The outer paddle face 43 may act as the surface which traces and nearly coincides with the feeder zone 320. The outer paddle face 43 may also nearly coincide with the inner face 53 of the dam 50 as the paddle assemblies 40 moves along the feeder path. In conjunction with the leading paddle edge 42, each paddle assembly 40 fits closely against the dam 50.

The dam 50 in one embodiment may include an inner face 53 positioned toward the feeder assembly 20 and shaped to nearly match the feeder zone 320. The dam 50 may have a leading edge 52 and a trailing edge 54. The leading edge 52 is described as leading in reference to the direction of rotation of the feeder assembly 20. In other words, the first edge met by the approaching paddle assembly 40 is the leading edge 52 of the dam 50. Accordingly, the last edge is referred to as the trailing edge 54.

The outer paddle face 43 and the leading paddle edge 42 may also pass very close to the lower edge 64 of the chute 60 in one embodiment. The lower chute edge 64 may nearly coincide with the trailing dam edge 54 so that, for example, none of the overs 11 pass between the chute 60 and the dam 50. In one embodiment where the dam 50 is stationary and the chute 60 may be moved with respect to the feeder assembly 20, the geometry of the lower chute edge 64 and the trailing dam edge 54 may be coordinated to avoid any interference between the dam 50 and the chute 60 when the chute 60 is in motion.

5. Automatic Redirection of Overs

Referring still to FIG. 4, in one embodiment where the chute 60 may be moved with respect to the feeder assembly 20, the position of the lower chute edge 64 nearly intersecting tangentially the feeder zone 320 represents one indication that the chute 60 is in the engaged position.

In one embodiment where the dam 50 is stationary and the chute 60 may be moved with respect to the feeder assembly 20, the position of the lower chute edge 64 near the trailing dam edge 54 represents another indication that the chute 60 is in the engaged position.

Figure 6:
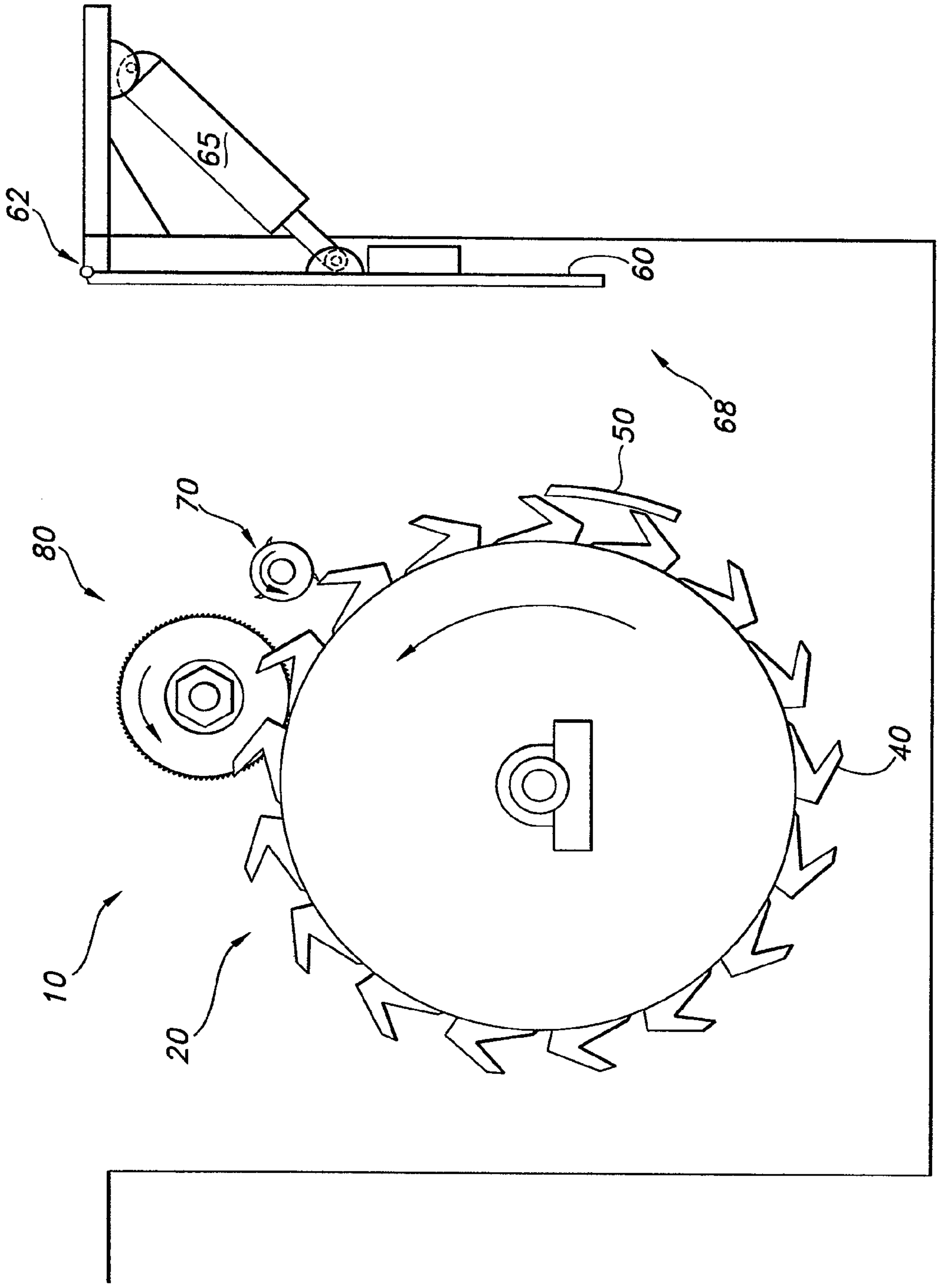
FIG. 6 is an illustration of a side elevation of an apparatus in a disengaged position, according to one embodiment of the present invention.

The apparatus 10 of the present invention, in one embodiment, includes a chute 60 that may be placed in at least two positions: an engaged position 67 (as shown in FIG. 1) and a disengaged position 68 (as shown in FIG. 6). Generally, from the engaged position 67, overs 11 are being guided into the feeder assembly 20. From the disengaged position 68, overs 11 are being guided away from the feeder assembly 20.

FIG. 6 shows the chute 60 in a disengaged position 68. In the embodiment shown, the chute 60 is articulated about a hinge 62, although other types of connections are contemplated. A chute actuator 65 may be provided to move the chute 60 to a desired position. In use, a chute actuator 65 may be a pneumatic or hydraulic cylinder, a chain drive, or any other motive means.

Moving the chute 60 to a disengaged position 68 ends the guidance of overs 11 toward the feeder assembly 20 and/or actively re-directs the flow of overs 11 away from the feeder assembly 20. In one embodiment, the overs 11 may be collected and re-cycled back to a position before the apparatus 10, where the overs 11 may re-enter the flow and eventually re-enter the apparatus 10.

The chute 60 may be disengaged for any of a variety of conditions. In one embodiment, the apparatus 10 of the present invention includes a master controller 200 and a plurality of sensors, as shown schematically in FIG. 5. The master controller 200 may be an analog or digital Programmable Logic Controller (PLC), a discrete logic system such as an Application-Specific Integrated Circuit (ASIC), or other programmed logic device. The master controller 200 may be used to receive sensor data and send signals to other controllers and assemblies, including on/off signals, timed notifications, and logic results. A master controller 200 in general may be programmed for on/off control, timing, logic, counting, and sequencing between and among multiple machines and elements in a system. A master controller 20 may use ladder logic, sequential function tables, software, databases, structured text, and/or any other type of programming capable of executing the desired instructions.

Figure 5:
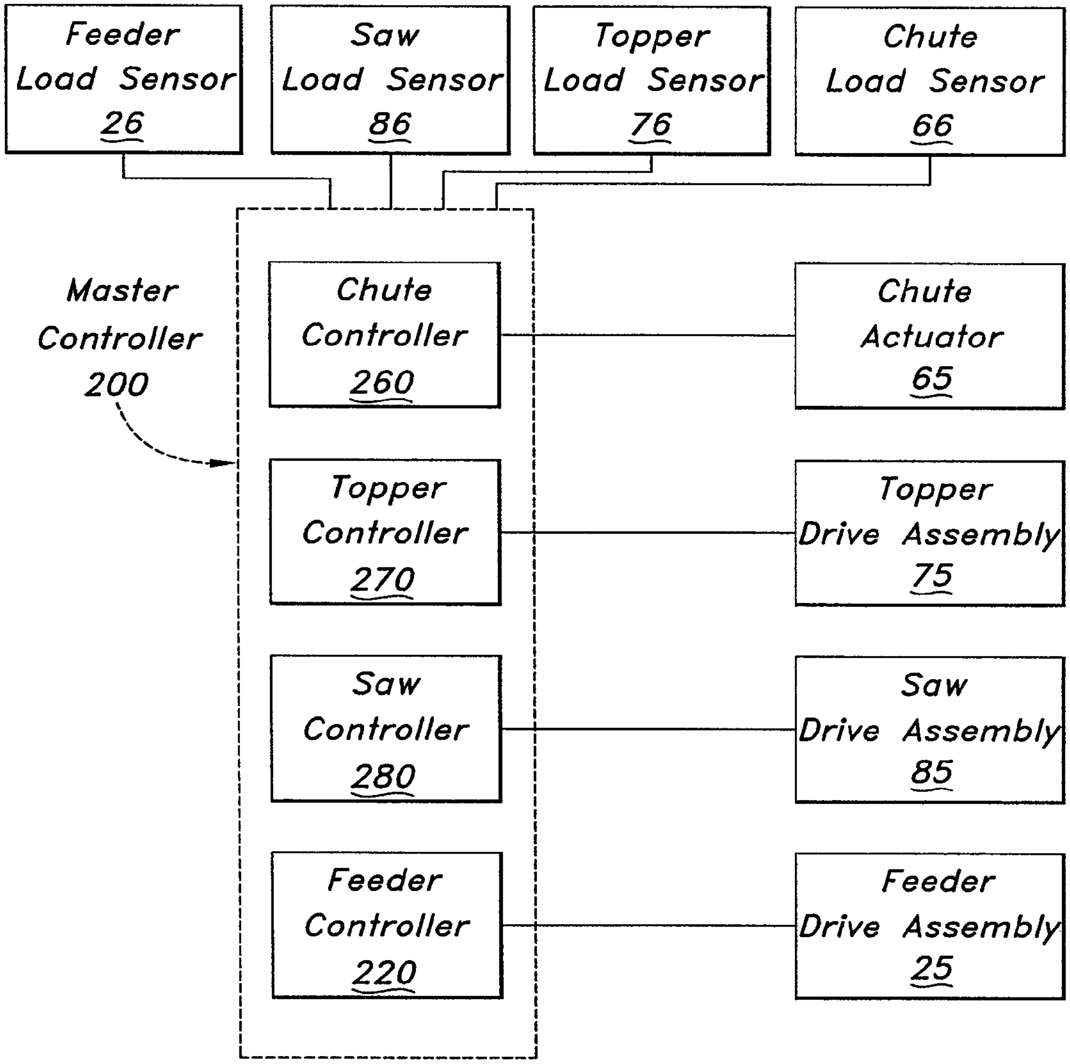
FIG. 5 is a schematic illustration of a control system, according to one embodiment of the present invention.

The master controller 200 may include one or more separate controllers for different elements, such as the ones shown in FIG. 5: a chute controller 260, a topper controller 270, a saw controller 280, and a feeder controller 220. Also, the apparatus 10 of the present invention may include a chute actuator 65, a topper drive assembly 75, a saw drive assembly 85, and a feeder drive assembly 25.

The master controller 200 may receive input signals from one or more discrete sensors, including a feeder load sensor 26, a saw load sensor 86, a topper load sensor 76. For an element driven by a motor, a load sensor may be installed such that it senses the amperage on the motor. A higher amperage may indicate an excessive drain on the motor, which in turn may indicate an excessive load. Similarly, a lower amperage may indicate a reduced or minimum load on the motor. In one embodiment of the present invention, the feeder load sensor 26, saw load sensor 86, and topper load sensor 76 are connected to the feeder drive assembly 25, saw drive assembly 85, and topper drive assembly 75, respectively, and configured to sense the load on the respective motors. If the load sensed exceeds a set maximum, the load sensor sends a fault signal to the master controller 200.

A master controller 200 may be programmed with rules to execute in response to any variety of conditions or modes, including normal, fault, emergency, slow, pause, or any combination of such modes. Also, for example, any variety of situations may represent a fault condition. Different situations may be programmed in the master controller 200 by writing instructions according to the logic rules governing the controller. Fault conditions may include jammed equipment, an undesirable object such as metal in the incoming flow, an overloaded motor or drive assembly, an under-loaded motor or drive indicating equipment is empty, or any combination of these factors on different elements or machines. A fault condition may also occur in response to a human input, such as pressing a fault button. The timing element in the master controller 200 allows a system to update its status based upon signals received when conditions change.

The master controller 200 may also receive input signals from a chute load sensor 66. In one embodiment, the chute load sensor 66 may be a metal detector. If metal is detected anywhere in the incoming flow of overs 11, the chute load sensor 66 may send a fault signal to the master controller 200.

In response to a fault signal from any load sensor 26, 86, 76, 66, the master controller 200 may be programmed to send a signal directing the chute actuator 65 to move the chute 60 to a disengaged position. With the chute disengaged, as shown in FIG. 6, the overs 11 may be allowed to fall outside the feeder assembly 20. The master controller 200 may also be programmed to reverse the direction of rotation of the feeder assembly 20, in order to unload all the overs 11.

Disengaging the chute 60 in response to a fault condition prevents the introduction of additional overs 11 into the apparatus 10. Reversal of the feeder assembly 20 in response to a fault condition unloads the current overs 11 from the apparatus 10.

In a fault condition, the feeder assembly 20 may rotate in this reversed direction until the feeder load sensor 26 reading indicates an empty condition, whereupon the master controller 200 may be programmed to return the apparatus 10 to normal operating mode.

6. Rest Mode

In one embodiment, the master controller 200 may be programmed to halt or pause the apparatus 10 when sensors indicate the incoming flow of overs 11 has stopped. In one embodiment of the present invention, the feeder load sensor 26, saw load sensor 86, and topper load sensor 76 are connected to the feeder drive assembly 25, saw drive assembly 85, and topper drive assembly 75, respectively, and configured to sense the load on the respective motors. A low amperage on a motor may indicate a reduced or minimum load on the motor. If the load sensed is less than a set minimum, indicating the apparatus 10 is empty of overs, the load sensor sends a fault signal to the master controller 200. In response, the master controller 200 may be programmed to stop driving and/or brake the active elements of the apparatus 10.

The master controller 200 may be programmed to return the apparatus 10 to normal operating mode if and when a signal from any load sensor indicates the presence of overs 11 to be processed.

7. A Method

The present invention also provides a method of processing wood chips. In one embodiment, a method generally includes directing a flow of overs 11 along a feeder path and into and a saw assembly 80. The method may include providing a feeder assembly to direct the overs 11 along the feeder path. The method may further include positioning a topper assembly 70 within the feeder path but in advance of the saw assembly 80, such that the topper assembly 70 removes complete overs 11 or otherwise reduces any portion of the overs 11 that may tend to extend into a shaft interference zone 382.

The method of the present invention may also include positioning the saw assembly 80 such that the shaft interference zone 382 nearly intersects tangentially with a feeder zone 320. The method may further include positioning the topper assembly 70 such that the topper zone 370 nearly intersects tangentially with the feeder zone 320.

An additional step may include equipping the feeder assembly 20 with one or more paddle assemblies 40, each having an array of slots 45 therethrough positioned to accept insertion of the array of blades 83. In another aspect of this step, the method may include shaping each paddle assembly 40 such that it aligns the overs 112 generally transverse to the array of blades 83 in preparation for cutting. Shaping each paddle assembly 40 may include providing a scoop portion shaped to cradle the overs 11 substantially within each paddle assembly and providing a fence portion shaped to contain the overs 11 substantially within each paddle assembly during cutting.

In one embodiment, the method may include mounting the paddle assemblies 40 to an endless chain driven along an endless feeder path about one or more powered rollers. The endless feeder path may include one or more either straight or curved segments.

8. Conclusion

The described embodiments of the invention are intended to be merely exemplary. Numerous variations and modifications will be apparent to those skilled in the art. All such variations and modifications are intended to fall within the scope of the present invention as defined in the appended claims.

What has been described above includes several examples. It is, of course, not possible to describe every conceivable combination of components or methodologies for purposes of describing the systems, methods, computer readable media and so on employed in planning routes. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

While the systems, methods, and apparatuses herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative systems and methods, or illustrative examples shown and described. Accordingly, departures may be made from such details without departing from the spirit or scope of the applicant's general inventive concepts.

What is claimed is:

1. A control system for a wood chip reducing apparatus, said apparatus having a saw assembly configured to be driven in a first rotational direction under a normal operating condition, a feeder assembly configured to be driven in a direction generally opposing said first rotational direction under a normal operating condition, a topper assembly configured to be driven in a direction generally opposing said first rotational direction under a normal operating condition, a chute disposed in an engaged position to guide a flow of wood chips toward said feeder assembly, and a chute actuator configured to move said chute relative to said feeder assembly between said engaged position and a disengaged position, said system comprising:

a saw load sensor operably connected to said saw assembly and configured to sense a saw load;

a feeder load sensor operably connected to said feeder assembly and configured to sense a feeder load;

a topper load sensor operably connected to said topper assembly and configured to sense a topper load;

a chute load sensor operably connected to said chute and configured to sense a chute load; and a master controller operably connected to each of said respective sensors, each of said respective sensors capable of transmitting at least a normal signal and a fault signal.

2. The control system of claim 1, wherein said master controller, in response to a fault signal from any of said respective sensors received at a start time:

directs said chute actuator to move said chute into said disengaged position, said disengaged position characterized by said chute guiding said wood chips away from said feeder assembly; and directs said feeder assembly to drive said feeder assembly in said first rotational direction.

3. The control system of claim 2, wherein said master controller, in response to a normal signal from each of said respective sensors received at an end time following said start time:

directs said chute actuator to move said chute into said engaged position; and directs said feeder assembly to drive said feeder assembly in a direction generally opposing said first rotational direction.

4. The control system of claim 1, wherein said master controller, in response to a fault signal from any of said respective sensors received at a first time:

directs said feeder assembly to pause said feeder assembly;

directs said saw assembly to pause said saw assembly; and directs said topper assembly to pause said topper assembly.

5. The control system of claim 4, wherein said master controller, in response to a normal signal from each of said respective sensors received at a second time following said first time, directs said feeder assembly, saw assembly, and topper assembly, respectively, to return to said normal operating condition.

* * * * *